Aug. 27, 1957 H. M. GEYER 2,804,053
ACTUATOR AND LOCKING MEANS THEREFOR
Filed April 14, 1954 2 Sheets-Sheet 1
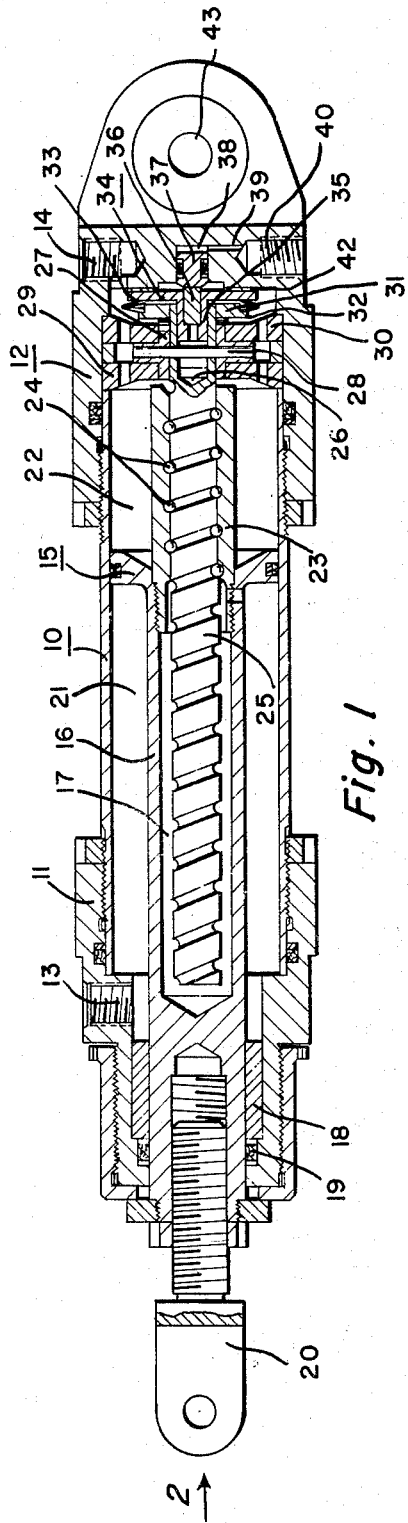
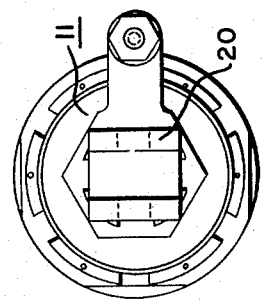
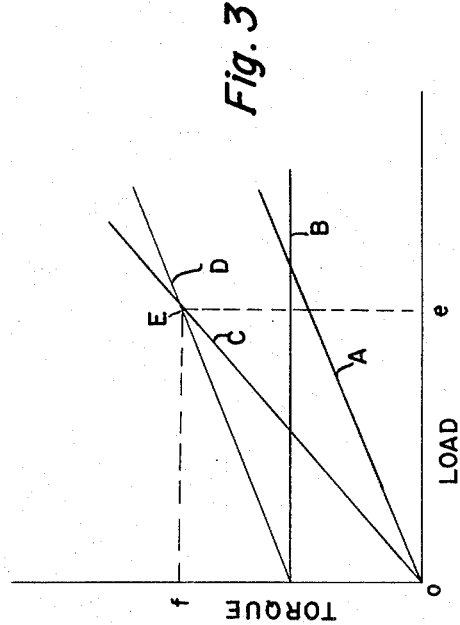
INVENTOR.
Howard M. Geyer
BY
Craig V. Morton
Attorney Aug. 27, 1957
H. M. GEYER
2,804,053
ACTUATOR AND LOCKING MEANS THEREFOR
Filed April 14, 1954
2 Sheets-Sheet 2
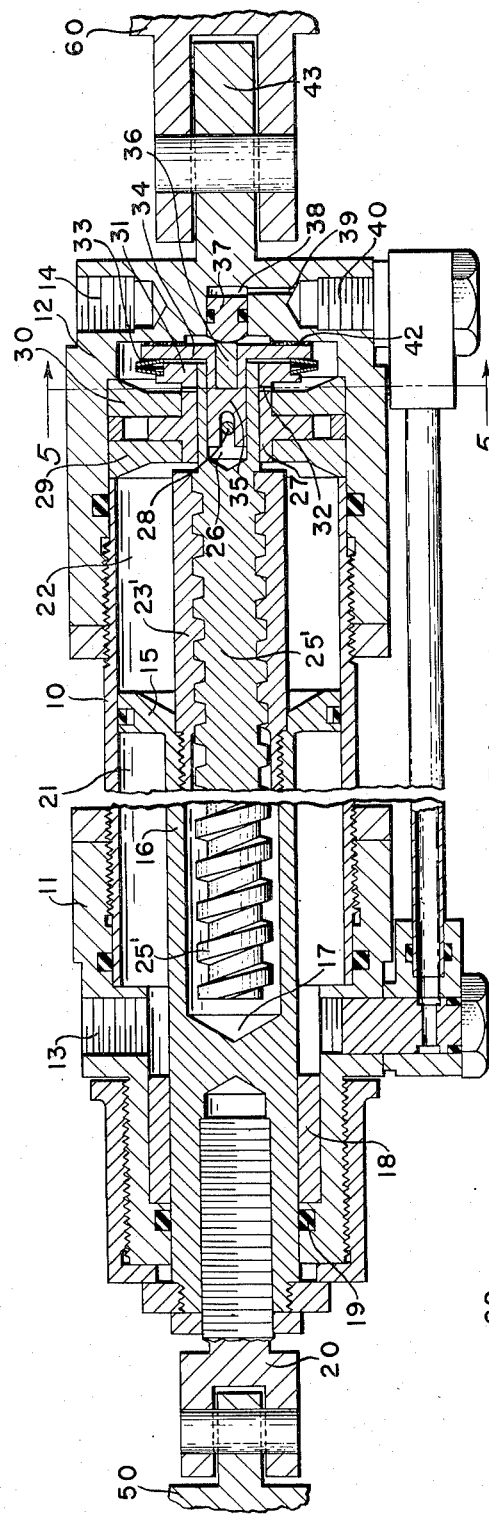
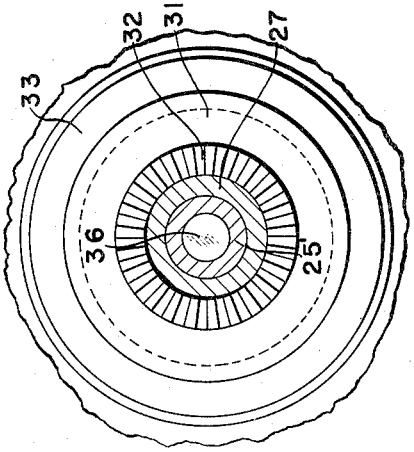
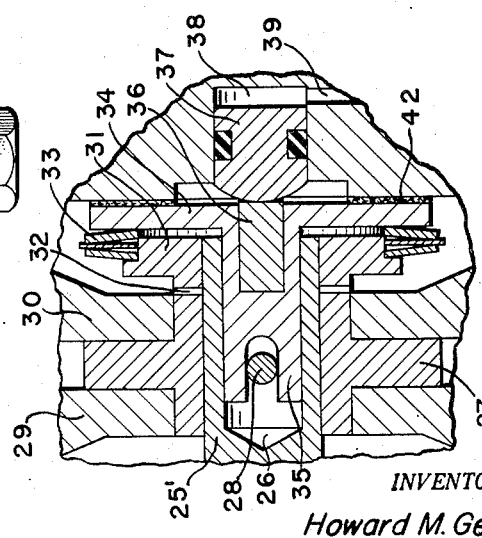
INVENTOR.
Howard M. Geyer
BY
Craig V. Morton
His Attorney

United States Patent Office 2,804,053
Patented Aug. 27, 1957

2,804,053

ACTUATOR AND LOCKING MEANS THEREFOR

Howard M. Geyer, Dayton, Ohio, assignor to General Motors Corporation, Detroit, Mich., a corporation of Delaware Application April 14, 1954, Serial No. 423,180

20 Claims. (Cl. 121—40)

This invention pertains to fluid pressure operated actuators, and particularly to self-locking fluid pressure operated actuators.

Heretofore, self-locking fluid pressure operated actuators, i. e. actuators of the type including a cylinder having disposed therein a reciprocable piston capable of fluid pressure actuation in either direction and incorporating means for automatically locking the piston against movement in the absence of fluid pressure actuation thereof, have been designed with various types of locking devices. For instance, my copending application, Serial No. 394,660, filed November 27, 1953, now Patent No. 2,774,336, discloses a friction type brake; my copending application Serial No. 296,607, filed July 1, 1952, now Patent Number 2,705,939, discloses a roller-clutch type lock, and my Patent No. 2,643,642, issued June 30, 1953, discloses a toothed type lock. However, none of these locking devices have been found to be satisfactory for some actuator installations. Accordingly, among my objects are the provisions of simplified locking means for an actuator of the aforementioned type; and the further provision of locking means which are self-acting.

The aforementioned and other objects are accomplished in the present invention by incorporating a preloaded plain bearing as the locking means. Specifically, the actuator comprises a cylinder having disposed therein a piston capable of fluid pressure actuation in either direction. The piston carries a non-rotatable member, which is constrained for lineal movement therewith. The non-rotatable member threadedly engages a rotatable member through the agency of a plurality of circulating balls. Alternatively, the rotatable member may comprise a high lead, reversible acme screw. The piston includes a rod which extends through one end wall of the cylinder and has attached thereto a suitable fixture which may be connected to either a movable load device or a fixed support.

The piston rod is formed with a centrally recessed portion, within which the rotatable member, or screw shaft, is coaxially disposed. The screw shaft is rotatably journaled within the cylinder, and is operatively connected with the plain bearing locking means. The plain bearing locking means includes a pair of annular elements having coengaging surfaces, one bearing element being attached to and rotatable with a screw shaft, and the other bearing element being secured to the non-rotatable cylinder. In addition, a brake member, which is connected to rotate with the screw shaft, is adapted for limited axial movement relative thereto to facilitate engagement and disengagement of a friction brake by means of a fluid pressure actuated lock release piston.

In operation, it will be appreciated that reciprocable movement of the piston is dependent upon relative rotation between the hollow nut member and the screw shaft. In the embodiment disclosed, the screw shaft must rotate relative to the nut inasmuch as the nut is constrained for linear movement with the piston and restrained against rotation. However, relative rotation between the nut and piston will cause a torque load to be imposed upon the screw shaft in proportion to the load imposed upon the actuator piston. This torque load is transmitted to the plain bearing locking means when the friction brake is applied. However, when the brake is released the screw shaft torque is constant and of small magnitude. The lock releasing means are so connected with the fluid pressure system for operating the actuator that upon the application of fluid pressure to the cylinder so as to effect piston movement in either direction, the locking means are released. However, upon the cessation of fluid pressure application to the cylinder, the locking means are automatically engaged by a Bellville spring which applies a restraining torque to screw thereby overloading the plain bearing so as to restrain further piston movement.

Further objects and advantages of the present invention will be apparent from the following description, reference being had to the accompanying drawing wherein a preferred embodiment of the present invention is clearly shown.

In the drawing:

Fig. 1 is a longitudinal view, partly in section and partly in elevation, of an actuator construction according to this invention.

Fig. 2 is an end view of the actuator taken in the direction of arrow 2 in Fig. 1.

Fig. 3 is a graph depicting the operation of the locking means.

Fig. 4 is a fragmentary longitudinal sectional view of a modified actuator constructed according to this invention.

Fig. 5 is an enlarged fragmentary view taken along line 5—5 of Fig. 4.

Fig. 6 is an enlarged fragmentary sectional view of the friction brake of the instant actuator.

With particular reference to Fig. 1, the actuator comprises a cylinder 10 having exteriorly threaded portions adjacent both ends. One end of the cylinder receives a tail cap 11, and the other end of the cylinder receives a head cap 12. The tail cap 11 of the cylinder is formed with an opening 13 which constitutes a port for the application and drain of fluid from one end of the cylinder 10. The head cap 30 is, likewise, provided with an opening 14, which constitutes a port for the application and drain of pressure fluid from the other end of the cylinder 10.

A piston 15 is disposed within the cylinder and adapted for reciprocable movement relative thereto under the urge of fluid pressure. The piston 15 includes an axially extending rod portion 16, which is coaxially arranged relative to the cylinder 10. The rod portion 16 is formed with a central recess 17, and extends through a central opening in the end cap 11. The piston rod 16 is slidably supported by a plain bearing 18 within the end cap 11, and suitable sealing means 19 are provided to prevent the leakage of fluid from the cylinder around the periphery of the rod. The free end of the rod 16 is threadedly connected to a fixture or clevis 20, which may be connected to either a relatively movable load device 50, as shown in Fig. 4, which prevents piston rotation. The cylinder clevis 43 may be attached to a fixed support 60, as shown in Fig. 4.

The piston 15 divides the cylinder 10 into a retract chamber 21 and an extent chamber 22. The piston 15 has attached thereto a hollow member 23 having an internal spiral groove, which member constitutes the nut of the well known ball-screw and nut coupling. The hollow nut 23 is restrained against rotation relative to the piston 15, and is constrained for linear movement therewith. The hollow nut member 23 has operative engagement with a rotatable member, or screw shaft 25 through the agency of a plurality of circulating balls 24. The balls circulate in passage means carried by the nut 23, not shown, in a conventional manner. The screw shaft 25 is, likewise, formed with a spiral groove having a substantially semi-circular cross section, and is coaxially disposed to project into the recessed portion of the piston rod 16. In the embodiment of Fig. 4, a reversible acme screw 25′ and a complementary nut 23 are employed as the rotating and non-rotating members of the actuator. Similar parts of the actuator depicted in Fig. 4 and the actuator depicted in Fig. 1 are indicated by like numerals.

The screw shaft 25 is formed with a recessed end portion 26, which end portion is connected to a plain bearing member 27 by means of a cross pin 28. The plain bearing member 27 is confined between a pair of spaced, annular bearing plates 29 and 30, such that axial movement of the screw shaft 25 is restrained, while rotation thereof is permitted. The bearing member 27 is operatively connected to an annular member, or spring holder 31, the operative connection therebetween being constituted by radial serrations 32. The spring holder 31 carries a Bellville spring 33, one edge of which is arranged to engage a friction brake member 34, constituting one component of the locking means, to be described.

The friction brake member 34 includes an axially projecting portion 35, which is slidably received in the screw shaft recess 26. The member 34 is connected to rotate with the screw shaft by means of the cross pin 28 which traverses a bifurcated portion thereof. The portion 35 carries a thrust pin 36, which is arranged for engagement with a lock release piston 37 disposed for reciprocable movement within a lock release cylinder 38. The lock release cylinder 38 is connected by a passage means 39 in the head cap member 12 to a lock release port 40. The friction brake member 34 is arranged to engage a friction surface 42, which is secured to the station tail cap member 12. It should be noted that the friction brake is very small, and, by itself, is not capable of either stopping or preventing rotation of the screw shaft 25. The only function of the friction brake is to apply resistive torque to the screw shaft 25.

The retract port 13, the extend port 14, and the brake release 40 may be interconnected with a fluid pressure system and valve means of the type disclosed in my aforementioned Patent 2,774,336. With this type of fluid pressure system, whenever pressure fluid is applied to either the retract or extend ports and chambers pressure fluid is concurrently applied to the brake release port 40 and brake release cylinder 38. Accordingly, whenever pressure fluid is applied to either actuator chamber, the locking means constituted by the plain bearing assembly are released so as to permit piston movement by the application of pressure fluid to the cylinder. However, in the absence of fluid pressure actuation of the piston, the Bellville spring 33 will apply a restraining torque to the rotating screw by friction contact between members 34 and 42 which, dependent upon the direction of the load, increases the torque load between plain bearing surfaces 27 and 30 or 27 and 29. In this manner the large plain bearing surfaces are overloaded causing a slight axial movement of the screw shaft 25 and thereby restrain rotation of the screw shaft 25.

As is well known to those skilled in the art, the torque required to effect rotation between two plain bearing members may be expressed by the following formula:

$T = \frac{2}{3} uLr^3$, wherein:

$T$ = torque required to effect relative rotation between the plain bearing members
$u$ = the coefficient of friction of the bearing members
$L$ = the load applied at right angles, or normal to the bearing members
$r$ = the bearing radius From the foregoing formula, it is readily apparent that the torque required to effect rotation between plain bearing members is directly proportional to the normal applied load. Thus, as the normal applied load increases, so does the torque required to effect rotation.

Now with reference to Fig. 3, the operation of the plain bearing locking means will be described. In Fig. 3, the abscissa indicates load applied normally to the plain bearing elements, while the ordinate represents the torque required to effect relative rotation between the plain bearing elements. Curve A merely indicates the relationship set forth in the preceding formula, that is, the torque required to effect relative rotation is proportional to the normally applied load. Curve B represents the applied normal preload on the friction braking members 34 and 42 effected by the Bellville spring 33. It will be apparent that this preload is constant. Curve C indicates the relationship between torque and load as regards the screw shaft 25. In comparing lines A and C, it will be observed that for any given load applied to the screw shaft 25, the torque would be sufficient to effect rotation between the plain bearing members. Curve D indicates the relationship between torque and load when the plain bearing means are preloaded by means of resistive torque created by friction brake 34 and 42. Thus, curve D is parallel to curve A but the torque required to effect rotation between the plain bearing members at zero load has been increased by an amount equal to that of the Bellville spring, or curve B.

It will be noted that curves C and D intersect at point E. The actuator of this invention is only to be used in installations wherein the applied load is less than the abscissa point represented by $e$, and, accordingly, the torque on screw 25 will never exceed or attain a value equal to ordinate point $f$. That is, a load of point $e$ is well above the highest normal load to which the actuator is to be subjected. As thrust loads on the screw shaft 25 due to loading of the piston 15 are supported by the thrust bearing surfaces of annular members 29 and 30, only torque is applied by the screw shaft to the brake member 34. The screw shaft and bearing elements are so constructed that a torque of value $f$ is never transmitted to the element 34 by the screw shaft 25. Accordingly, the locking means will always be effective to restrain movement of the piston 15 and the screw shaft 25 in the absence of fluid pressure application to the lock release cylinder 38.

*Operation*

In an actuator installation, the movable load may be connected to either the clevis 20 or the clevis 43 attached to the head cap member 12. The actuator disclosed herein is of the linear type, in distinction to the rotary type, but it will be appreciated that the principles set forth herein are readily applicable to rotary actuators, and the embodiment set forth is only exemplary. It will further be observed that only relative linear movement between the piston and cylinder is required to effect movement of the load device. Assuming clevis 43 to be attached to fixed supporting structure, and clevis 20 to be connected to the movable load device, actuator operation is as follows, it being understood that a suitable source of fluid pressure and valving means, not shown, must be provided. When pressure fluid is applied to the retract port 13, extend port 14 is simultaneously connected to drain. Accordingly, pressure fluid will be applied to the retract chamber 21, while the extend chamber 22 will be connected to drain. Concurrently, with the application of pressure fluid to retract chamber 21, pressure fluid is applied through port 40 and passage 39 to the brake release cylinder 38. In this manner, the brake release piston 37 is moved to the left, as viewed in Fig. 1, whereupon the braking member 34 will be moved axially out of engagement with the braking member 42 so as to permit relative rotation therebetween. Thus, the application of pressure fluid to retract chamber and the release of the locking means will permit movement of piston 15 to the right, which movement is dependent upon relative rotation between the hollow nut member 23 and the screw shaft 25. As screw shaft 25 is free to rotate, movement of the piston 15 may be effected.

When the application of pressure fluid to retract chamber 21 is interrupted, the application of pressure fluid to the lock release cylinder 38 is simultaneously interrupted, thereby permitting the Bellville spring 33 to move the braking member 34 into engagement with the braking member 42. In this manner, a resistive torque load is imposed on the screw shaft which will overload the plain bearings 27 and 29 or 27 and 30 whereby locking the screw shaft 25 and piston 15. At this time, the actuator piston is locked against movement by the locking means, and this phenomenon occurs whenever pressure fluid is not being applied to either of the cylinder chambers, and at all positions of the piston within the cylinder.

Conversely, when extend port 14 is connected to the source of pressure fluid, and retract port 13 is connected to drain, pressure fluid will be applied to the extend chamber 22 and concurrently therewith, pressure fluid will be applied to the lock release cylinder 38. Accordingly, the locking means will be released thereby permitting movement of piston 15 to the left under the urge of pressure fluid in extend chamber 22.

From the foregoing, it is apparent that the present invention provides unique locking means, of the self-acting type, for a fluid pressure operated actuator.

While the embodiment of the present invention as herein disclosed, constitutes a preferred form, it is to be understood that other forms might be adopted.

What is claimed is as follows:

1. A fluid pressure actuator including, a cylinder, a reciprocable piston disposed in said cylinder capable of fluid pressure actuation in either direction, and releasable locking means operatively associated with said piston for preventing movement thereof including a screw shaft connected with said piston so as to rotate upon piston movement and a plain bearing assembly rotatably supporting said screw shaft, said locking means including said plain bearing asesmbly.

2. A fluid pressure actuator including, a cylinder, a reciprocable piston disposed in said cylinder capable of fluid pressure actuation in either direction, a member rotatably supported in said cylinder by a plain bearing assembly and operatively connected with said piston such that movement of said piston is dependent upon rotation of said member and releasable locking means operatively associated with said member for preventing rotation thereof, whereby said piston is locked against movement, said locking means including said plain bearing assembly.

3. A fluid pressure actuator including, a cylinder, a reciprocable piston disposed in said cylinder capable of fluid pressure actuation in either direction, a member journaled for rotation relative to said cylinder by a pair of plain bearing elements and operatively connected with said piston such that movement of said piston is dependent upon rotation of said member, and releasable locking means operatively connected with said member for normally preventing movement thereof in the absence of fluid pressure application to said cylinder, said locking means comprising said pair of plain bearing elements and means for imposing a resistive torque load on said rotatable member.

4. A fluid pressure actuator including, a cylinder, a reciprocable piston disposed in said cylinder capable of fluid pressure actuation in either direction, locking means operatively associated with said piston for preventing movement thereof including a screw shaft connected with said piston so as to rotate upon piston movement and a plain bearing assembly rotatably supporting said screw shaft in the absence of fluid pressure application to said cylinder, said locking means including said plain bearing assembly, and means operable to release said locking means concurrently with the application of pressure fluid to said cylinder.

5. A fluid pressure actuator including, a cylinder, a reciprocable piston disposed in said cylinder capable of fluid pressure actuation in either direction, a member rotatably supported in said cylinder by a plain bearing assembly and operatively connected with said piston such that movement of said piston is dependent upon rotation of said member, locking means operatively connected with said member for preventing movement thereof in the absence of fluid pressure application to said cylinder, said locking means including said plain bearing assembly, and means to release said locking means concurrently with the application of pressure fluid to said cylinder so as to permit piston movement.

6. A fluid pressure actuator including, a cylinder, a reciprocable piston disposed in said cylinder capable of fluid pressure actuation in either direction, a member supported for rotation relative to said cylinder by a plain bearing assembly and operatively connected with said piston such that movement of said piston is dependent upon rotation of said member, the operative connection between said member and said piston including a non-rotatable element disposed in said cylinder and constrained for movement with said piston, said element having operative engagement with said member so as to effect rotation thereof upon movement of said piston, and releasable locking means operatively associated with said rotatable member for preventing rotation thereof and consequent reciprocation of said piston in the absence of fluid pressure application to said cylinder, said locking means including said plain bearing assembly.

7. A fluid pressure actuator including, a cylinder, a reciprocable piston disposed in said cylinder capable of fluid pressure actuation in either direction, a member supported for rotation relative to said cylinder by a plain bearing assembly and operatively connected with said piston such that movement of said piston is dependent upon rotation of said member, the operative connection between said member and said piston including a non-rotatable element disposed in said cylinder and constrained for movement with said piston, said element having operative engagement with said member so as to effect rotation thereof upon movement of said piston, locking means operatively associated with said rotatable member for preventing rotation thereof and consequent reciprocation of said piston in the absence of fluid pressure application to said cylinder, said locking means including said plain bearing assembly, and means operatively associated with said locking means for releasing the said locking means upon the application of pressure fluid to said cylinder.

8. A fluid pressure actuator including, a cylinder, a reciprocable piston disposed in said cylinder capable of fluid pressure actuation in either direction, a first member disposed in said cylinder, a second member disposed in said cylinder, one of said members being constrained for movement with said piston and restrained against rotation, the other of said members having operative engagement with said one member and supported for rotation relative to said cylinder by a plain bearing assembly whereby reciprocation of said piston will effect relative rotation between said members, and releasable locking means operatively associated with said members for preventing relative rotation therebetween and consequent reciprocation of said piston in the absence of fluid pressure application to said cylinder, said locking means including said plain bearing assembly.

9. A fluid pressure actuator including, a cylinder, a reciprocable piston disposed in said cylinder capable of fluid pressure actuation in either direction, a first member disposed in said cylinder, a second member disposed in said cylinder, one of said members being constrained for movement with said piston and restrained against rotation the other of said members having operative engagement with said one member and supported for rotation relative to said cylinder by a plain bearing assembly whereby reciprocation of said piston will effect relative rotation between said members, locking means operatively associated with said members for preventing relative rotation therebetween and consequent reciprocation of said piston in the absence of fluid pressure application to said cylinder, and means to release said locking means upon the application of pressure fluid to said cylinder so as to permit relative rotation between said members and movement of said piston, said locking means including said plain bearing assembly.

10. A fluid pressure actuator including, a cylinder, a reciprocable piston disposed in said cylinder capable of fluid pressure actuation in either direction, a hollow member disposed in said cylinder and constrained to move with said piston, a member disposed in said cylinder having operative connection with said hollow member and extending therethrough, one of said members being supported for rotation relative to said cylinder by a plain bearing assembly, the construction and arrangement being such that movement of said piston is dependent upon relative rotation between said members, and releasable locking means operatively associated with said member for preventing relative rotation therebetween and consequent reciprocation of said piston, said locking means including said plain bearing assembly.

11. A fluid pressure actuator including, a cylinder, a reciprocable piston disposed in said cylinder capable of fluid pressure actuation in either direction, a hollow member disposed in said cylinder and constrained to move with said piston, a member disposed in said cylinder having operative connection with said hollow member and extending therethrough, one of said members being supported for rotation relative to said cylinder by a plain bearing assembly, the construction and arrangement being such that movement of said piston is dependent upon relative rotation between said members, locking means operatively associated with said members for preventing relative rotation therebetween and consequent reciprocation of said piston in the absence of fluid pressure, application to said cylinder, said locking means including said plain bearing type assembly, and fluid pressure operated means for releasing said locking means to permit relative rotation between said members and consequent movement of said piston upon the application of pressure fluid to either side of said piston.

12. A fluid pressure actuator including, a cylinder, a reciprocable piston disposed in said cylinder capable of fluid pressure actuation in either direction, a first member rotatably supported in said cylinder by a plain bearing assembly, a second non-rotatable member in said cylinder having operative engagement with said rotatable member, one of said members being operatively connected to said piston and constrained to move therewith, the construction and arrangement being such that relative rotation occurs between said members upon movement of said piston, and releasable locking means operatively associated with the rotatable member for preventing rotation thereof and consequent movement of said piston in the absence of fluid pressure application to said cylinder, said locking means including said plain bearing assembly.

13. A fluid pressure actuator including, a cylinder, a reciprocable piston disposed in said cylinder capable of fluid pressure actuation in either direction, a member rotatably supported in said cylinder and operatively connected to said piston such that movement of said piston is dependent upon rotation of said member, and releasable locking means operatively associated with said member for preventing rotation thereof in the absence of fluid pressure application to said cylinder, said locking means comprising a pair of plain bearing elements which rotatably support said member, one of said elements being non-rotatable and the other of said elements being connected to rotate with said member, and means for imposing a resistive torque load on said rotatable member so as to overload said plain bearing elements and prevent rotation of said member.

14. The combination set forth in claim 13 wherein said last recited means comprises a releasable friction brake operatively connected with said rotatable member.

15. A fluid pressure actuator including, a cylinder, a reciprocable piston disposed in said cylinder capable of fluid pressure actuation in either direction, a member rotatably supported in said cylinder and operatively connected with said piston so as to rotate in response to piston movement, locking means operatively associated with said member for preventing rotation thereof and consequent reciprocation of said piston in the absence of fluid pressure application to said cylinder, said locking means comprising a plain bearing assembly for rotatably supporting said member and a friction brake for applying resistive torque to said member so as to overload said plain bearing assembly, and means operable to release said friction brake so as to permit rotation of said member and consequent reciprocation of said piston upon the application of pressure fluid to said cylinder.

16. The combination set forth in claim 15 wherein said plain bearing assembly comprises a pair of plain bearing elements, one of said bearing elements being restrained against rotation, the other of said bearing elements being connected to rotate with said member.

17. The combination set forth in claim 15 wherein said friction brake includes a pair of braking members, one of said braking members being adapted for axial movement relative to the other of said braking members, and wherein the means for releasing said locking means comprises a lock release piston which is capable of fluid pressure actuation so as to effect relative axial movement between said braking members so as to permit movement of said piston.

18. An actuator assembly including in combination, a cylinder, a reciprocable piston in said cylinder, a member disposed in said cylinder and operatively connected to said piston so that reciprocation of said piston is dependent upon rotation of said member, a plain bearing assembly operatively connected with said member for rotatably supporting the said member within said cylinder, and releasable means for applying a resistive torque load on said member whereby said plain bearing assembly will become overloaded so as to preclude rotation of said member and lock the piston against movement.

19. An actuator assembly including in combination, a cylinder, a reciprocable piston in said cylinder, a member disposed in said cylinder and operatively connected to sad piston so as to rotate in response to piston reciprocation, a plain bearing assembly operatively connected with said member for rotatably supporting the said member within said cylinder, a friction brake operatively associated with said member and operable, when engaged, to apply a resistive torque load on said member so as to overload said plain bearing assembly and preclude rotation of said member, and means for engaging or disengaging said friction brake so as to permit or preclude movement of said piston.

20. In a screw and nut type actuator, a screw shaft, plain bearing means rotatably supporting said screw shaft, and means for applying a resistive torque load to said screw shaft to overload said plain bearing means and lock said screw shaft against rotation.

References Cited in the file of this patent

UNITED STATES PATENTS

| | | |
|---|---|---|
| 679,421 | Halsey | July 30, 1901 |
| 1,077,862 | Stafford | Nov. 4, 1913 |
| 1,643,563 | Nell | Sept. 27, 1927 |
| 1,650,383 | Osgood | Nov. 22, 1927 |
| 1,824,477 | Gartin | Sept. 22, 1931 |
| 2,523,053 | Obrist | Sept. 19, 1950 |

FOREIGN PATENTS

| | | |
|---|---|---|
| 436,271 | France | Jan. 19, 1912 |
| 644,424 | Great Britain | Oct. 11, 1950 |